United States Patent [19]

Chimura et al.

[11] 3,962,185

[45] June 8, 1976

[54] POLYESTER COMPOSITIONS HAVING A DURABLE ANTISTATIC PROPERTY

[75] Inventors: Kazuya Chimura; Hiroshi Iwata, both of Ohtake; Kazunori Kagawa, Hiroshima; Kazuhiko Ishida, Ohtake, all of Japan

[73] Assignee: Mitsubishi Rayon Co., Ltd., Tokyo, Japan

[22] Filed: Aug. 7, 1974

[21] Appl. No.: 495,361

Related U.S. Application Data

[63] Continuation-in-part of Ser. No. 277,573, Aug. 3, 1972, abandoned.

[30] Foreign Application Priority Data

Dec. 22, 1971 Japan.............................. 46-104316

[52] U.S. Cl............................. 260/47 C; 260/47 P; 260/75 P; 260/860; 260/DIG. 16

[51] Int. Cl.$^2$.................. C08G 63/18; C08G 63/46; C08G 63/70

[58] Field of Search................. 260/860, 75 P, 47 P, 260/47 C

[56] References Cited

FOREIGN PATENTS OR APPLICATIONS 2,239,466    7/1973    Germany

*Primary Examiner*—Howard E. Schain
*Attorney, Agent, or Firm*—Frank J. Jordan

[57] ABSTRACT

A durably antistatic polyester composition comprising a polyethylene terephthalate-based polyester and an antistatic agent including a phosphorous acid triester derivative therein containing a polyalkylene oxide chain in the molecule.

7 Claims, No Drawings

POLYESTER COMPOSITIONS HAVING A DURABLE ANTISTATIC PROPERTY

CROSS-REFERENCE TO RELATED APPLICATIONS

This application is a continuation-in-part of co-pending application Ser. No. 277,573, filed Aug. 3, 1972, now abandoned.

BACKGROUND OF THE INVENTION

FIELD OF THE INVENTION

This invention relates to a polyester composition having a durable antistatic property and, more particularly, to polyesters such as polyesters of a terephthalate to which a novel phosphorus-containing anti-static agent has been added.

DESCRIPTION OF THE PRIOR ART

Polyesters, especially polyethylene terephthalate, have heretofore been widely used as fibers, films or other moldings in the industrial field because of their high crystallinity, melting point and tenacity as well as their superior chemical stability.

Since polyesters, like many other synthetic polymers, are hydrophobic and greatly tend to be charged with static electricity even due to their slight friction, they will present some problems such as adsorption of dust, repellence and clinging, unpleasant noises and shocks due to discharge, when they are processed and the resulting products are in practical use.

To eliminate such electrocharging phenomena, there have generally been used the processes for applying an antistatic agent to the surface of polyester articles. These "after-treatment" processes, however, are not satisfactory ones because the antistatic agent thus applied will easily fall off the surface of the articles due to the rubbing or cleaning of the surface thereby decreasing the antistatic effect with lapse of time and further because it may vary the properties of the surface thereby providing the articles with undesirable appearance and frictional characteristics, for instance. In addition, there have been proposed many processes for providing polyester articles with antistatic property by adding an antistatic agent to a polyester polymer before it is molded into the articles. In the practice of these processes, conventional antistatic agents are necessary to add to a polyester in a large proportion to obtain a sufficiently antistatic property on polyester articles molded from the polyester, they will decompose at a temperature at which the polyester is molded because of being generally thermally unstable or they will react with the polyester, thereby, frequently, coloring the polyester articles, lowering the physical properties thereof and making the molding operation difficult.

Among antistatic agents which may be added to polyesters, polyalkylene oxide type compounds have been disclosed in various reports such as West German patent 1228025 and U.S. Pat. No. 3560591.

The polyalkylene oxide type compounds, such as polyethylene glycol, which have heretofore been proposed are necessary to incorporate into a polyester in amounts of at least 5% by weight thereof in order to provide the polyester with a sufficiently antistatic property and, further, they will decrease the melt viscosity of a polyester incorporated therewith and make difficult the molding operation of said incorporated polyester if they have one or two terminal hydroxyl groups or even if these groups are capped with hydrocarbon radicals. In addition, they are disadvantageous in that they color polyester articles wherein they are contained and lower the stability to light thereof.

SUMMARY OF THE INVENTION

This invention has been attained as a result of studies made in an attempt to obtain antistatic agents which eliminate the disadvantage of the conventional ones, especially polyalkylene oxide type compounds, and now provides a polyester composition which contains an antistatic agent having no adverse effects on the operations of molding the polyester composition and, further, allows polyester articles molded therefrom to have a durable antistatic property while they retain the original, satisfactory physical and chemical properties of the polyester base.

The polyester compositions of this invention thus comprise a polyester wherein at least 80 mol % of the component units is ethylene terephthalate, with 0.1 to 10% by weight of an antistatic compound of the general formula:

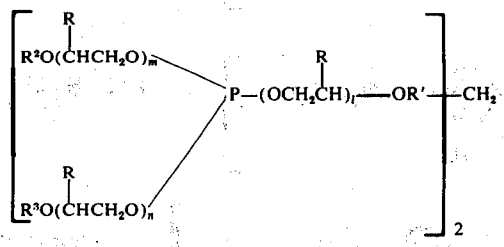

wherein R is hydrogen or methyl; R' is phenylene with or without hydrocarbon radical substituents; $R^2$ and $R^3$ are each $C_{1-18}$ alkyl, or phenyl with or without hydrocarbon radical substituents; and l, m and n are each an integer of from 1 to 200.

DESCRIPTION OF THE PREFERRED EMBODIMENTS

The new compounds which may be used as the antistatic agents in this invention, even when incorporated into a polyester in small amounts as compared with the conventional polyalkylene oxide type compounds, will provide polyester articles made of the resulting polyester composition with a satisfactory and durable antistatic property. And they will be stable without substantial reaction with and coloration of a polyester even when mixed with the polyester and then exposed to temperatures higher than the melting point of the polyester. Even a phorphorus acid triester of ω-alkyl or aryl-polyalkylene glycol, which may also be used in the synthesis of the antistatic additives according to this invention, will have a considerable antistatic effect on a polyester article when added to the polyester. However, this antistatic effect is not so durable and will gradually be lost by repeated washing, cleaning and like treatments. In view of this, it is very significant that the antistatic agents represented by the general formula according to this invention can provide a polyester with a more durable antistatic property when incorporated into the polyester.

The compounds which may be used as the antistatic agents in this invention, include the following:

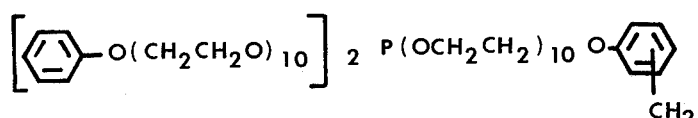
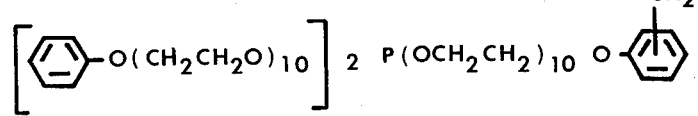
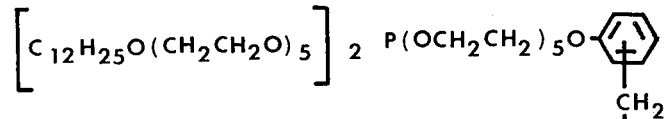
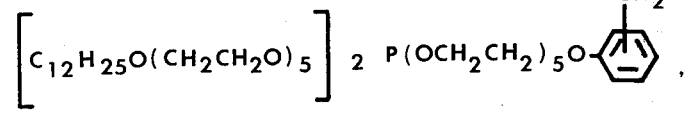
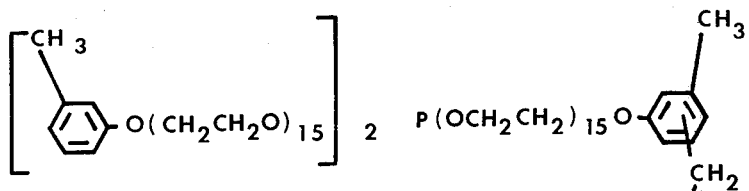
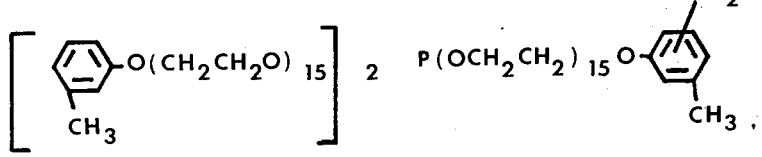
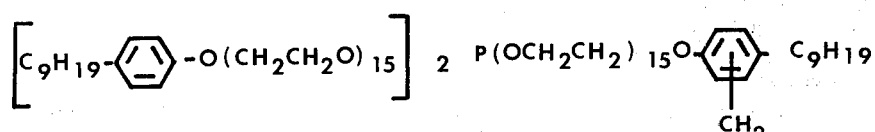
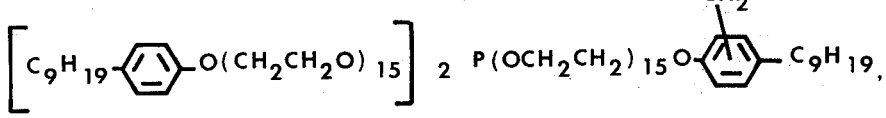
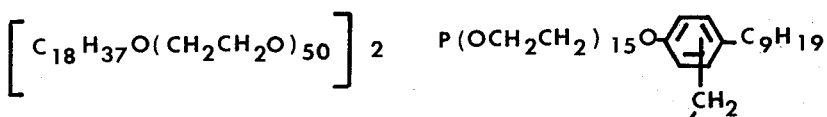
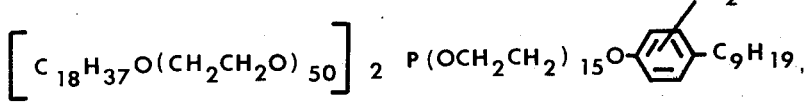
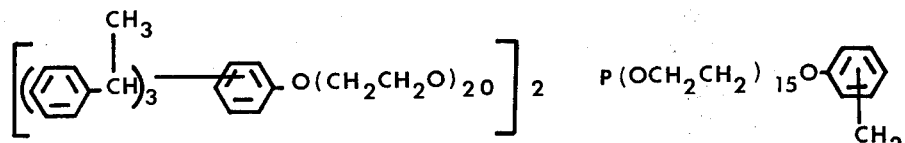
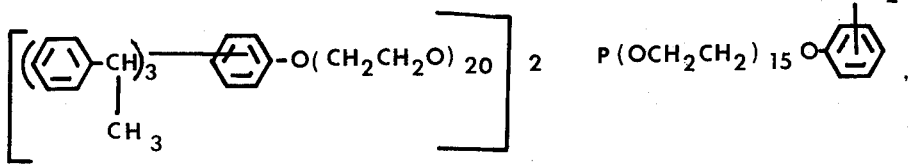

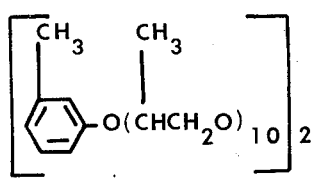 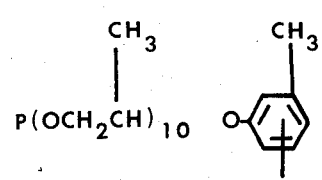

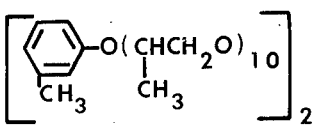 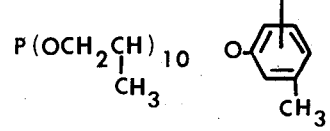

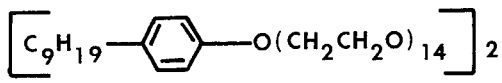 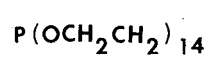

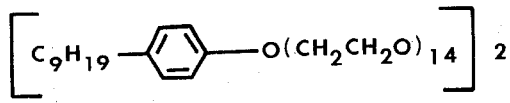 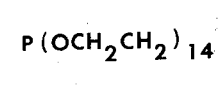

There are several methods for the synthesis of these antistatic compounds.

As one of said methods there is a method wherein a condensation reaction is effected between a phosphorus acid triester of ω-alkyl or aryl polyalkyleneglycol and formaldehyde. This reaction can easily be conducted in the same manner as that between a phenolic compound and formaldehyde. When a phosphorus acid triester of ω-alkyl or arylpolyalkylene glycol is used in said reaction, the reaction should preferably be carried out in an organic solvent or in the absence of a solvent since said phosphorous acid triester is slightly hydrolyzable with water but is not so hydrolyzable as a low molecular weight phosphorous acid triester. In this reaction paraformaldehyde and trioxane may also be used as a source of formaldehyde. The antistatic agents according to this invention are synthesized by reacting phosphorous acid triester of ω-alkyl or arylpolyalkylene glycol with formaldehyde in a molar ration of 2 : 1, but other molar ratios slightly different from the former may practicably be used.

A phosphorus acid triester is generally synthesized by reacting an alcohol or phenolic compound corresponding to the ester group of the triester with phosphorus trichloride and removing the hydrochloric acid produced, or by transesterifying the alcohol or phenolic compound with triphenyl phosphite and removing the phenol produced.

As another of said methods, thus, there is also a method wherein triphenyl phosphite is reacted with 2 mol of ω-alkyl or arylpolyalkylene glycol and 1/2 mol of a compound obtained by reacting an alkylene oxide with a methylene bisphenol derivative previously made by condensing a phenolic compound with formaldehyde in a molar ratio of 2 : 1.

The term "polyester" herein used means a polyethylene terephthalate or a copolyester wherein at least 80 mol % of the component units is ethylene terephthalate.

Comonomers which may be used in the production of the copolyester are dicarboxylic acids such as isophthalic, adipic and sebacic acids, and their derivatives, and glycols such as diethylene glycol and 1,4-butanediol.

In addition, the polyesters used in this invention may be those which are modified with a small amount of a branching agent such as glycerine, pentaerythritol, trimethylolpropane or trimesic acid.

The antistatic agents according to this invention are incorporated into a polyester in amounts of 0.1 – 10%, preferably 0.5 – 5%, by weight thereof. They will have a small antistatic effect on the polyester when incorporated therein in amounts of less than 0.1% by weight, while they will lower the polyester in melt viscosity thereby making it difficult to mold the polyester and will not be expected to have an extremely great antistatic effect on the polyester when incorporated therein in amounts of more than 10% by weight.

The new antistatic agents according to this invention may be incorporated in a reaction system wherein a polyester is being produced, in a polyester in a still molten state soon after its formation by polymerization, or in chips or powdered chips of a polyester before molded. The agents can also be thoroughly uniformly mixed with a polyester simply by adding to and kneading with the polyester previously chipped, since the agent and polyester can satisfactorily be mutually dissolved in each other. Such uniform mixing of the agent with the polyester will not be hampered at all by delustering agents such as titanium oxide, various known stabilizers, glass fibers, pigments and the like additives even if these additives are present in the polyester. Further, in the practice of this invention, the antistatic agents may be used together with the known polyalkylene oxide type compounds in amounts of up to 50% by weight of the agents used. Such known compounds include polyalkylene glycols such as polyethylene glycol and polypropylene glycol, and their derivatives wherein at least one of the terminal hydroxyl groups of the glycol is capped with a hydrocarbon radical such as an alkyl or phenyl group. These compounds may preferably be used together with the antistatic agents according to this invention.

When incorporated in a polyester these known antistatic compounds will generally raise problems in view of the fact that they have a somewhat small antistatic effect on the polyester, greatly color it and give it an unsatisfactory stability to light; while, when incorporated in a polyester together with the antistatic compounds according to this invention, they will solve said problems with aid of the anti-oxidation effect and originally great antistatic effect of said compounds according to this invention.

The thus-obtained polyester composition of this invention can be formed or molded to desired shapes such as fibers, films or sheets, by use of a suitable process such as melt spinning, extrusion molding or injection molding. The shapes so obtained have a satisfactory antistatic property as they are and, in certain cases, they are then heat-treated thereby increasing their antistatic effect. Such heat treatment is preferable particularly for articles made from the fibers and is effected at a temperature of at least 110° C, preferably at least 150° C in dry condition and at least 130° C in wet condition, for at least 30 seconds. It is supposed that this heat-treatment is also effective in exuding part of the incorporated antistatic agent to the surface of the shapes.

As previously mentioned, the shapes obtained from the compositions of this invention have not only satisfactory, durable antistatic properties but also secondary advantageous properties such as good dyeability, stain-proof property, hydrophile property, hygroscopicity and good surface smoothness.

This invention will be better understood by the following examples.

The "intrinsic viscosity [η]" described in the examples is that as determined at 25° C in a mixed solvent consisting of phenol and tetrachloroethane in a ratio by weight of 1 : 1.

EXAMPLE 1

A polyethylene terephthalate with a [η] of 0.72 in a still molten state soon after its formation by polymerization, was incorporated and then mixed with 2% by weight of a compound (A) having the following formula:

the compound being prepared by reacting 768 g of m-cresol addition reacted with 15 mol ethylene oxide and 103.5 g of triphenyl phosphite at 110°– 120° C in the presence of 1.0 g of NaOH while removing the produced phenol under reduced pressure from the reaction system, and two hours later entirely removing the free phenol at 140°– 150° C and under a pressure of 1 mm Hg, the phenol recovered amounting to 93.2 g, to obtain phosphorous acid triester having the formula

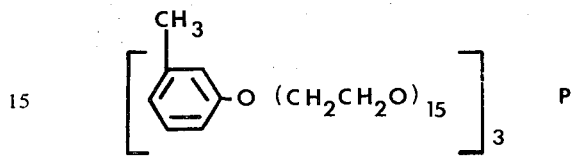

(this triester being a viscous, light yellow-colored liquid which flows at room temperatures), and then reacting the thus-obtained phosphorous acid triester with powdered paraformaldehyde (6 g) in the molar ratio of 2 : 1 at 110° C for two hours thereby obtaining the compound A which had a softening point of about 15° C and was a viscous liquid at room temperatures. The compound A so obtained was tested by the vapor pressure osmosis method (by the use of a Vapor Pressure Osmometer produced by Mechrolab Inc., Calif., U.S.A.) using acetone as the solvent, with the result that the molecular weight of the compound A was found to be 4400 (theoretical molecular weight : 4682). The elemental analysis showed C 59.0% (theoretical 57.7%),H 8.54% (theoretical 8.65%) and P 1.29% (theoretical 1.32%). The P (phosphorus) in the compound A exhibited a reducing property, and the amount of oxygen needed for oxidation was 95% of the theoretical value obtained from the structural formula of the compound A. The mixture thus obtained was cooled to obtain chips thereof. The chips were melt spun at 280°C, drawn at 75° C in the usual drawing manner in a drawing ratio of 3.5 and then heat-treated at 140° C to produce multifilaments of 150 denier/48 filaments.

The multifilaments, after scoured and washed with water, were knitted to obtain a plain stitch fabric having a weight of 70 g/m². The fabric was washed with methanol and then rubbed with a cotton cloth as the rubbing cloth at 20° C under a relative humidity of 50% using a drum rotation type tester for measuring the friction-charged voltage while rotating the drum at 750 rpm, with the result that the fabric so rubbed was found to be a 2100 volts whereas the corresponding polyethylene terephthalate fabric (containing no antistatic agents) found to be at 1000 volts or higher. The former

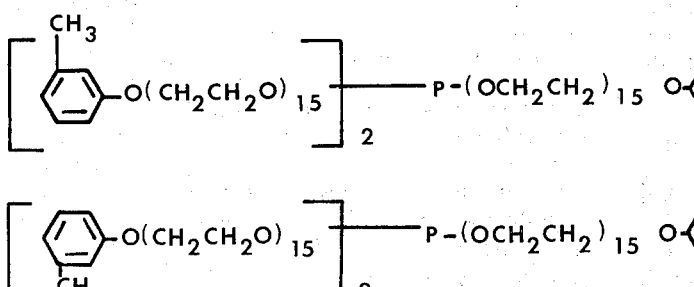 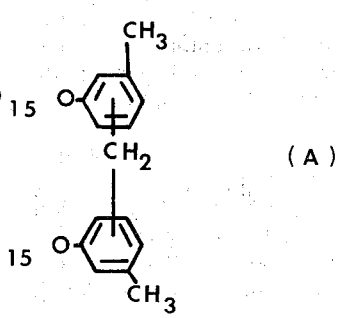

was still at a voltage of as low as 2350 volts even after repeating ordinary washing five times with an anionic surfactant for domestic use. These test results showed that the fabric according to this invention had a durable antistatic property.

For comparison, there was tested a polyester filament-knitted fabric obtained from a polyester composition wherein the same phosphorous acid triester as above, which was not reacted with formaldehyde yet, was contained in the amount of 2% by weight, with the result that the fabric showed 2500 volts as its voltage before subjected to washing, while it showed 8000 volts after five times repeatedly washed thereby indicating a great decrease of its initial antistatic effect.

As shown in the Table, the antistatic agents according to this invention had superior durable antistatic effects on the polyester without side effects such as breakage of the molecular chain of the polyester and also gave the polyester a satisfactory whiteness. The Table further shows that, for comparison, the use of a polyethylene glycol as the antistatic agent was less effective and remarkably apt to decrease the molecular weight of the polyester wherein the polyethylene glycol was incorporated.

Table 1

| Experiment No. | Antistatic Agent | Amount of agent added (wt %) | $[\eta]$ | Whiteness PI (%) | Friction-charged voltage Before washed | After five times washed |
|---|---|---|---|---|---|---|
| 1 | $\{[C_6H_5-O(CH_2CH_2O)_{10}]_2P(OCH_2CH_2)_{10}O-C_6H_4\}_2CH_2$ | 5 | 0.63 | 98.5 | 750 | 800 |
| 2 | $[C_{12}H_{25}O(CH_2CH_2O)_5]_2P(OCH_2CH_2)_5O-C_6H_4\}_2CH_2$ | 4 | 0.63 | 97.9 | 1100 | 1550 |
| 3 | $\{[C_9H_{19}-C_6H_4-O(CH_2CH_2O)_{15}]_2P(OCH_2CH_2)_{15}O-C_6H_3(C_9H_{19})\}_2CH_2$ | 2 | 0.66 | 98.7 | 1750 | 2050 |
| 4 | $[C_{18}H_{37}O(CH_2CH_2O)_{50}]_2P(OCH_2CH_2)_{10}O-C_6H_4\}_2CH_2$ | 2 | 0.64 | 98.7 | 2700 | 2850 |
| 5 | $\{[(C_6H_5-CH(CH_3))_3C_6H_3-O(CH_2CH_2O)_{20}]_2P(OCH_2CH_2)_{10}O-C_6H_4\}_2CH_2$ | 2 | 0.65 | 99.5 | 2100 | 2700 |

| Comparison Experiment No. | | | | | | |
|---|---|---|---|---|---|---|
| 1 | Polyethylene glycol (M.W. 20000) | 5 | 0.41 | — | — | — |
| 2 | Polyethylene glycol (M.W. 20000) | 2 | 0.55 | 91.0 | 8500 | >10000 |
| 3 | None | 0 | 0.67 | 99.2 | >10000 | >10000 |

EXAMPLE 2

Chips of a polyethylene terephthalate having a $[\eta]$ of 0.70 were incorporated with each of the compounds listed in Table 1. Each of the mixtures so obtained was melt spun at 270°–280° C and drawn in a drawing ratio of 3.7. The filaments thus obtained were tested for their antistatic property, intrinsic viscosity and whiteness, which are shown in the Table. The whiteness was represented by PI value (%) of CIE (Commission Internationale de l'Eclairge) color designation, the PI value being represented by the formula: PI = 100% – Pe, wherein the Pe value is determined by a spectrophotometer using magnesium oxide cake as the standard white material.

EXAMPLE 3

Nonylphenol was reacted with formaldehyde in a molar ratio of 2 : 1 to form a bisphenol which was then addition-reacted with ethylene oxide in a molar ratio of 1 : 20, and other nonylphenol was addition reacted with ethylene oxide in a molar ratio of 1 : 10. The thus-obtained ethylene oxide adduct of the bisphenol and ethylene oxide adduct of the nonylphenol were simultaneously reacted with a triphenyl phosphite and the phenol produced by the reaction was removed from the reaction system thereby producing an antistatic agent of the following formula:

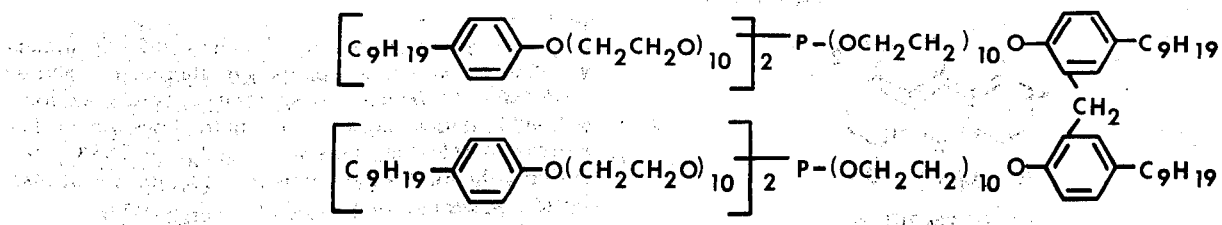

Then, the powdered chips of a polyethylene terephthalate having a $[\eta]$ of 0.72 were divided into portions 1 – 4.

1. Portion 1 was incorporated with 3% by weight of the above antistatic agent to form a polyester composition (1).

2. Portion 2 was incorporated with 2% by weight of the above antistatic agent and 1% by weight of monomethoxypolyethylene glycol (Molecular Weight: 20000) to form a polyester composition (2).

3. Portion 3 was incorporated with 3% by weight of monomethoxypolyethylene glycol (Molecular Weight: 20000) to form a polyester composition (3).

4. Portion 4 was not incorporated with such antistatic agents to remain a plain polyester (4).

The thus-prepared polyester compositions (1) to (4) were each treated in the same manner as in Example 2 to produce filaments therefrom. The filaments so produced were tested for filament properties and antistatic property, which results are shown in Table 2. Filaments (1)' and (2)' respectively obtained from the polyester compositions (1) and (2) have a superior durable antistatic property and can particularly be enhanced in antistatic property by heat treatment. These filaments (1)' and (2)' are not substantially inferior in strength, elongation and whiteness but have an increased dyeability as compared with the filaments (4)' obtained from the plain polyester (4). Filaments (3)' obtained from the polyester composition (3) have lower antistatic property than the filaments (1)' and (2)', and have poor strength and will have poor light fastness after being dyed.

formaldehyde in the same molar ratio as in Example 1 to obtain a compound which was then added in an amount of 2.5% by weight to the powdered chips of a polyester having a $[\eta]$ of 0.70 wherein 8 mol % of diethylene glycol was copolymerized. The mixture so obtained was melt spun at 260°C to form filaments which were drawn in a drawing ratio of 3.2 at 68°C and then heat-treated at 135°C to obtain multifilaments of 150 denier/30 filaments.

The multifilaments were texturized at 180°C in the false twist manner and knitted into plain stitch fabric having a weight of 140 g/m² which was then tested for its friction-charged voltage with the result that the fabric showed a satisfactory antistatic property represented by a voltage of 1500 volts.

EXAMPLE 5

The same antistatic compound as used in Example 3 was incorporated in an amount of 2% by weight into a polymerizing reaction system wherein a polyethylene terephthalate having a $[\eta]$ of 0.30 – 0.35 was being produced, and the reaction was then continued at 280°C until the $[\eta]$ reached a value of 0.75. The polymer thus obtained was cooled and chipped, and the Table 2

| | Filament | | (1)' | (2)' | (3)' | (4)' |
|---|---|---|---|---|---|---|
| Filament properties | Intrinsic | viscosity $[\eta]$ | 0.67 | 0.65 | 0.56 | 0.68 |
| | Strength | Original | 4.52 | 4.18 | 3.70 | 4.78 |
| | (g/d) | After exposure [1] | 3.60 | 3.21 | 2.16 | 3.65 |
| | Elongation (%) | | 22.9 | 21.5 | 23.0 | 21.6 |
| | Whiteness PI value (%) | | 98.4 | 97.9 | 92.8 | 98.6 |
| | Dye-[2] ability | Dye exhaustion (%) | 95.2 | 97.2 | 98.0 | 89.1 |
| | (Textured Yarn) | Light fastness (Class) | 4 | 3–4 | 2–3 | 4 |
| Antistatic property (Friction- charged voltage (V)) | Flat Yarn | | | | | |
| | a. After scouring | | 940 | 700 | 4500 | >10000 |
| | b. After scoured and then five times washed | | 1420 | 2270 | 8150 | >10000 |
| | c. After scoured and then steamed at 130°C for 10 min. | | 130 | 270 | 3200 | >10000 |
| | d. After scoured, steamed at 130°C for 10 min. and then five times washed | | 700 | 1050 | 7400 | >10000 |
| | e. After scoured and then dyed | | 1100 | 1760 | 6900 | >10000 |
| | Textured Yarn f. After scoured and then dyed | | 1800 | 2100 | 7500 | >10000 |

[1] Carbon arc light test  200 hours' radiation
[2] C.I. Disperse Red 15 (C.I. 60710)  2% owf, 120°C × 90 min. Liquid Ratio 1 : 50

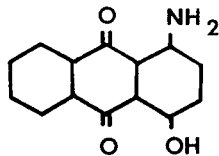

EXAMPLE 4

A phosphorous acid triester of ω-cresyl poly(ethylene-propylene) glycol, prepared in the same manner as in the phosphorous acid triester of ω-cresyl polyethyleneglycol used in Example 1 except the ethylene oxide was substituted by a mixture of 80% of ethylene oxide and 20% of propylene oxide, was reacted with chips were polymerized in a solid phase at 230°C under vacuum to the extent that the $[\eta]$ thereof reached a value of 0.95. The chips so treated were injection-molded into test pieces of 5 mm in thickness under the conditions that the chips were molten at 285°C, the mould was at 160°C, the molding pressure was at 600 kg/cm² and the molding cycle was 60 seconds.

The test pieces so obtained were charged by being rubbed with a cotton cloth in the same manner as in Example 1 and then tested for their friction-charged voltage with the result that they showed a voltage of 400 volts which implied a very satisfactory antistatic effect, whereas those made of the usual polyethylene terephthalate showed a voltage of 4000 volts.

EXAMPLE 6
A polyethylene terephthalate having a [η] of 0.70 in a molten state was blended continuously with 4% by weight of a compound by the use of a mixer provided with a twin screw, the compound to be blended being represented by the followng formula B:
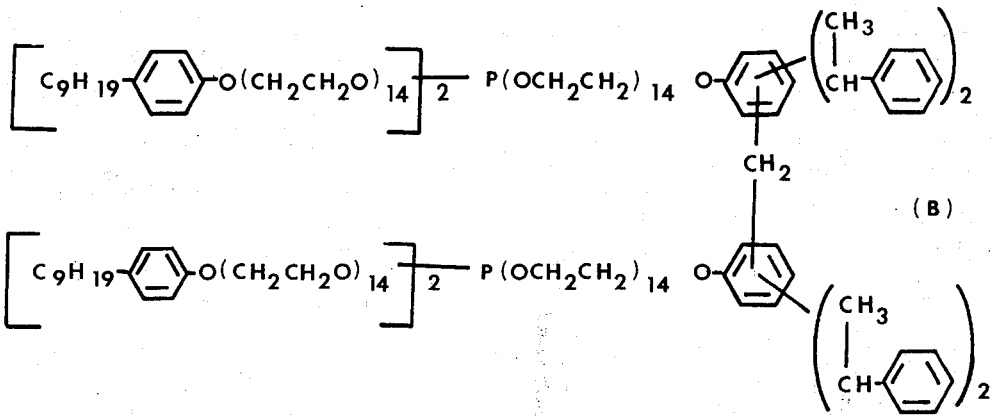
In addition, the compound B was synthesized by the following sequence of reactions:
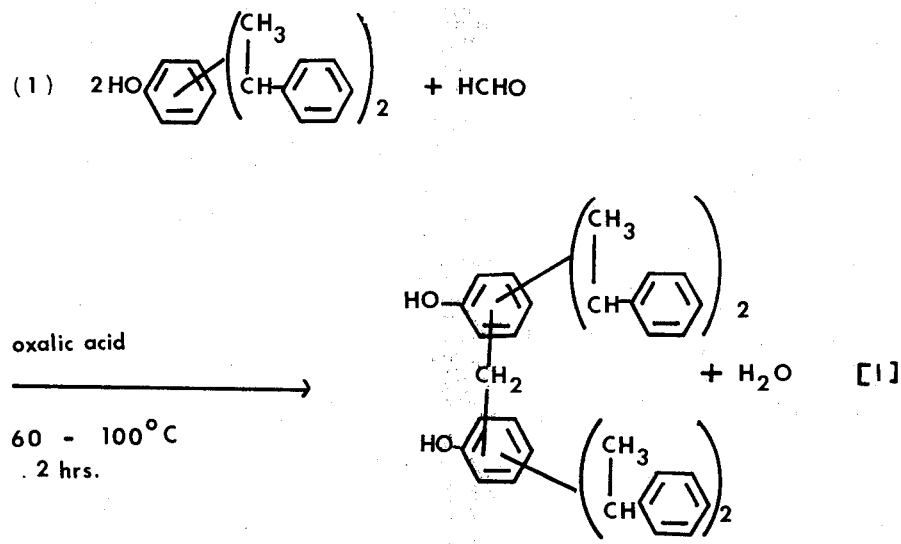
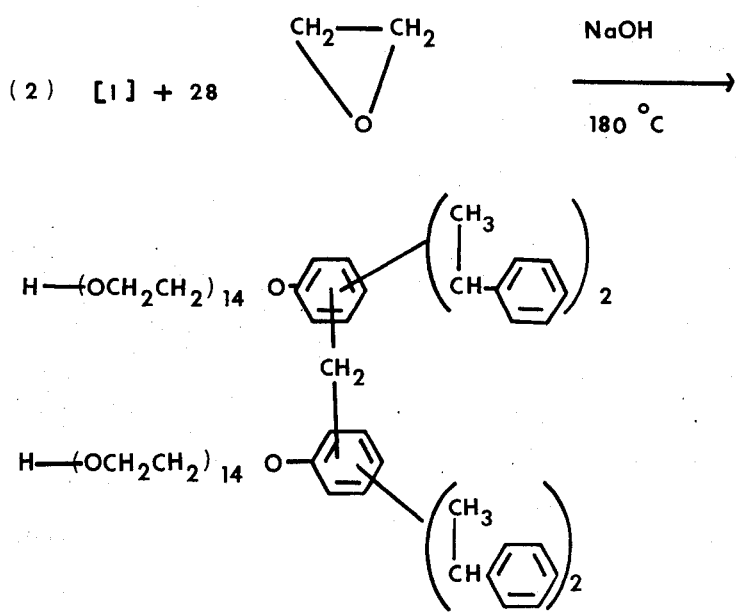

(3) 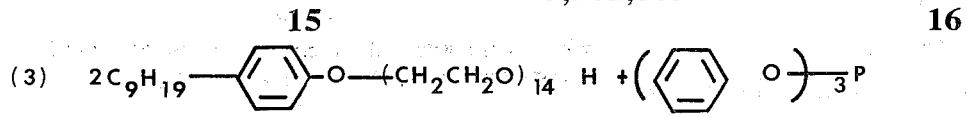

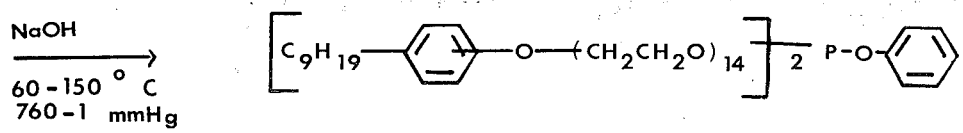

+ 2 ⌬OH ↑   [ III ]

(4) 2 [ III ] + [ II ] →(NaOH, 150°C, 10-1 mmHg) compound B + 2 ⌬OH

The compound B thus synthesized was a viscous liquid having a softening point of 15°C and specific gravity of 1.10.

The compound B was tested by the use of the vapor pressure osmosis method and then found to have a molecular weight of 5350 (theoretical 5225) and contain P (phosphorus) in the amount of 1.21% (theoretical 1.18%).

The thus-obtained compound was melt spun at 275°C, drawn to an extent that a drawing ratio of 3.2 was attained, and then treated by using a hot plate at 145°C thereby obtaining multifilaments of 150 denier/30 filaments.

The filaments after false-twisted with a hot plate at 205°C, were made into a plain-knitted web of 120 g/m² which was then tested in the same manner as in Example 1 to find frictional electric voltage with the result that the web was at a voltage of 880 V indicating a satisfactory antistatic property. The web exhibited a voltage of 1300 V even after subjected to washing five times, this indicating that the web has a durably antistatic property.

What is claimed is:

1. A durably antistatic polyester composition comprising (a) a polyester wherein at least 80 mole % of the component units is ethylene terephthalate and, in amounts of 0.1 – 10% by weight of the polyester, (b) a compound having the general formula:

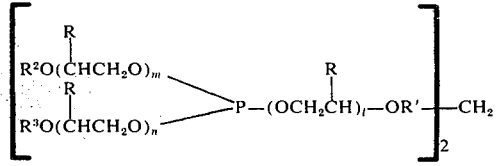

wherein R is selected from the group consisting of a hydrogen atom and a methyl group; R' is a member selected from the group consisting of unsubstituted phenylene and phenylene substituted with one or more hydrocarbon radicals; $R^2$ and $R^3$ are each selected from the group consisting of $C_1$ to $C_{18}$ alkyl, unsubstituted phenyl, and substituted phenyl containing one or more hydrocarbon radical substituents; and $l$, $m$ and $n$ are each an integer of from 1 to 200.

2. A durably antistatic polyester composition according to claim 1, wherein component (b) is contained in amounts of 0.5 – 5% by weight of component (a).

3. A durably antistatic polyester composition according to claim 1, further comprising, in amounts of up to 50% by weight of (b), a compound selected from the group consisting of polyalkylene glycols and derivatives thereof at least one of whose terminal hydroxyl groups has been substituted by a hydrocarbon radical.

4. A durably antistatic polyester composition according to claim 1, wherein the polyester is polyethylene terephthalate.

5. A durably antistatic polyester composition according to claim 1, wherein (b) is selected from the group consisting of

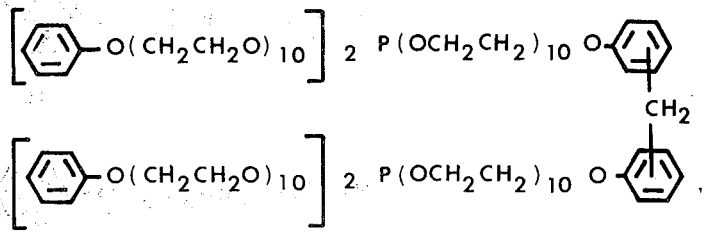

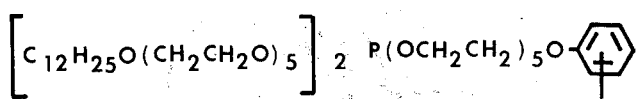
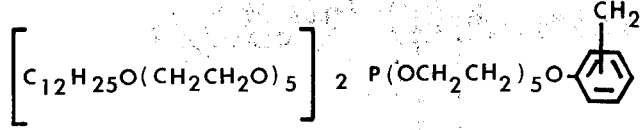
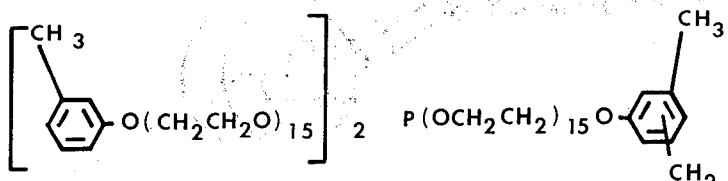
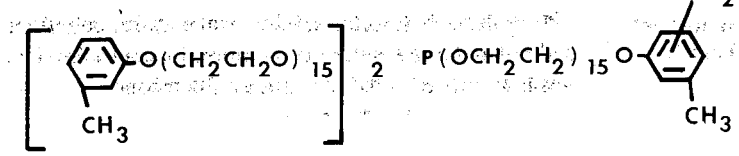
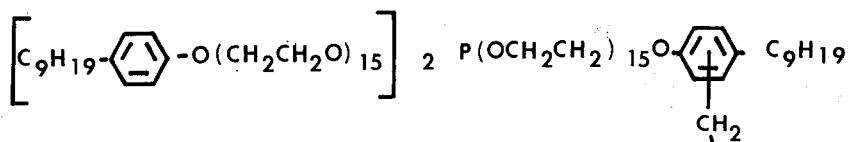
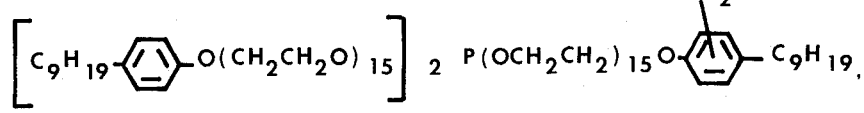
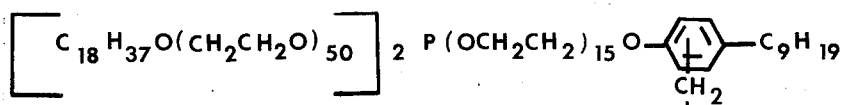
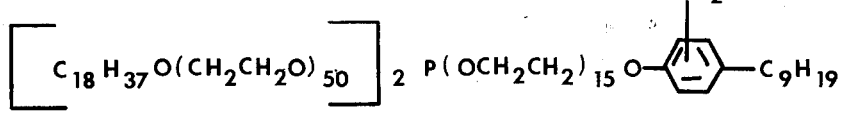
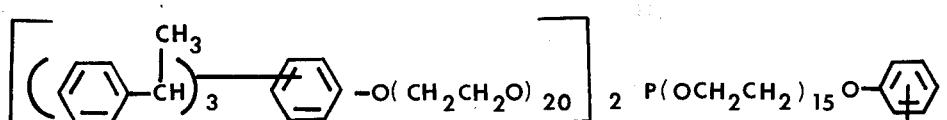
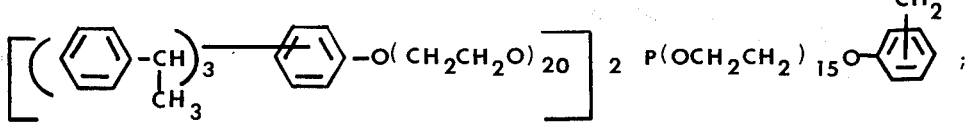
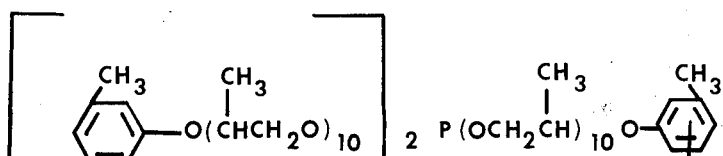
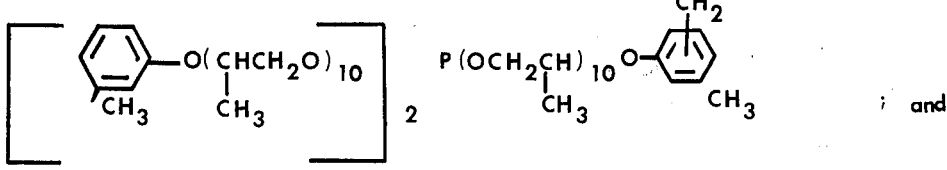
; and

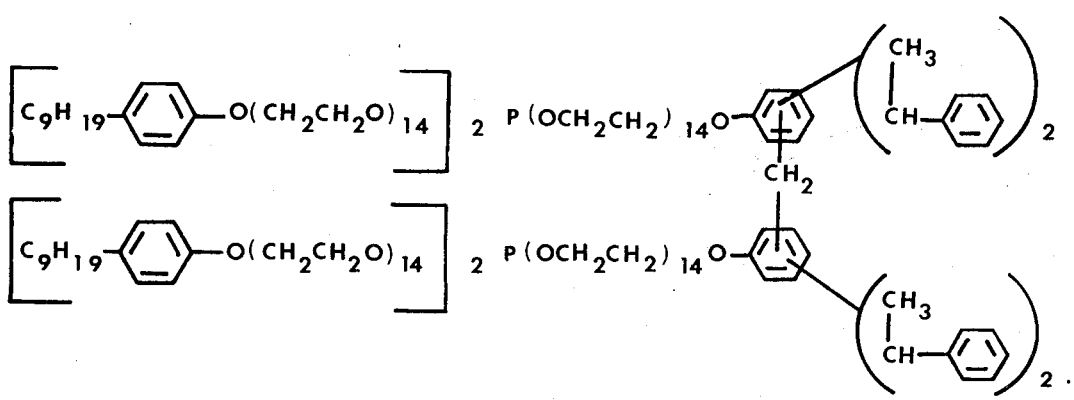
6. Polyester articles in the form of fiber, film or sheet, molded from the polyester composition of claim 1.
7. Polyester fiber obtained by heat-treating fiber molded from the polyester composition of claim 1 at not lower than 110°C for at least 30 seconds.
* * * * *